United States Patent [19]

Buss

[11] 4,061,592

[45] Dec. 6, 1977

[54] HYDROCARBON CONVERSION CATALYST

[75] Inventor: Waldeen C. Buss, Richmond, Calif.

[73] Assignee: Chevron Research Company, San Francisco, Calif.

[21] Appl. No.: 640,366

[22] Filed: Dec. 12, 1975

Related U.S. Application Data

[60] Division of Ser. No. 233,236, March 9, 1972, Pat. No. 3,951,782, which is a continuation-in-part of Ser. No. 200,121, Nov. 18, 1971, abandoned, which is a continuation-in-part of Ser. No. 132,715, April 9, 1971, abandoned.

[51] Int. Cl.$^2$ .......................... B01J 27/04; B01J 27/08; B01J 27/10; B01J 23/64
[52] U.S. Cl. ..................................... 252/439; 252/441; 252/442; 208/139; 252/466 PT; 252/473
[58] Field of Search ............... 208/138, 139; 252/441, 252/442, 473, 439, 466 PT

[56] References Cited

U.S. PATENT DOCUMENTS

| | | | |
|---|---|---|---|
| 2,500,146 | 3/1950 | Fleck et al. | 208/137 |
| 2,888,397 | 5/1959 | Burton et al. | 252/466 PT X |
| 3,415,737 | 12/1968 | Kluksdahl | 252/466 PT X |
| 3,578,584 | 5/1971 | Hayes | 252/441 X |
| 3,630,961 | 12/1971 | Wilhelm | 252/439 |
| 3,632,525 | 1/1972 | Rausch | 252/442 |
| 3,660,309 | 5/1972 | Hayes et al. | 252/442 |
| 3,755,198 | 8/1973 | Stratenus | 252/466 PT |
| 3,790,473 | 2/1974 | Rausch | 252/441 X |
| 3,790,504 | 2/1974 | Duhaut et al. | 252/441 X |
| 3,868,317 | 2/1975 | Itoh et al. | 252/441 X |
| 3,939,102 | 2/1976 | Hayes | 252/441 X |

FOREIGN PATENT DOCUMENTS

| | | | |
|---|---|---|---|
| 6,908,540 | 12/1970 | Netherlands | 252/466 PT |
| 7,008,386 | 12/1971 | Netherlands | 252/466 PT |
| 771,313 | 3/1957 | United Kingdom | 208/138 |

OTHER PUBLICATIONS

Lapporte et al., "Hydrogenation of Aromatics With Complex Metal Catalysts", J. Org. Chem., 28, (July, 1963), pp. 1947–1948.

Primary Examiner—Patrick P. Garvin
Attorney, Agent, or Firm—D. A. Newell; R. H. Davies; W. D. Reese

[57] ABSTRACT

A catalytic composition of matter comprising 0.01 to 5 weight percent of a platinum group component, 0.01 to 5 weight percent of a Group IIB component and 0.1 to 3 weight percent of a halogen in association with a porous solid carrier and processes for the hydroconversion of hydrocarbons using said catalyst.

2 Claims, 9 Drawing Figures

HYDROCARBON CONVERSION CATALYST

CROSS-REFERENCE

This application is a division of my copending application Ser. No. 233,236, filed Mar. 9, 1972, now U.S. Pat. No. 3,951,782, which is, in turn, a continuation-in-part of my application Ser. No. 200,121, filed Nov. 18, 1971, now abandoned, which is, in turn, a continuation-in-part of my application Ser. No. 132,715, filed Apr. 9, 1971, now abandoned.

BACKGROUND OF THE INVENTION

1. Field of the Invention

The present invention is directed to hydrocarbon hydroconversion processes, and more particularly, to reforming processes. Still more particularly, the present invention is concerned with a catalytic composition and a process for the hydroconversion of hydrocarbons in the presence of the catalytic composition. The catalyst comprises a platinum group component and a Group IIB component, preferably zinc or cadmium, in association with a porous solid carrier. The catalyst may advantageously also comprise 0.01 to 3 weight percent of a second catalyst component, preferably selected from the group consisting of a rhenium component, a tin component, a germanium component, and a lead component.

2. Prior Art

Hydrocarbon hydroconversion processes, such as hydrocracking, hydrogenation, hydrofining, isomerization, alkylation, desulfurization and reforming, are of special importance in the petroleum industry as a means for improving the quality and usefulness of hydrocarbons. The requirement for a diversity of hydrocarbon products, including, for example, high quality gasoline, has led to the development of many catalysts and procedures for converting hydrocarbons in the presence of hydrogen to useful products. A particularly important hydrocarbon hydroconversion process is reforming. Although many features of the present invention are discussed in terms of reforming, it is to be understood that the present invention relates to other hydrocarbon hydroconversion processes as well.

In the development of catalysts for catalytic hydroconversion processes, it is important that the catalyst exhibit not only the capability to initially perform the specified functions but also that it has the capability to perform satisfactorily for prolonged periods of time. Thus, in the development of new catalysts, attention must be directed to the activity, selectivity, and stability characteristics of the catalyst. The activity of a catalyst is a measure of the catalyst's ability to convert hydrocarbon reactants to products at a specified severity level, i.e., at a particular temperature, pressure, hydrogen-to-hydrocarbon mole ratio, etc. The selectivity of the catalyst refers to the ability of the catalyst to produce high yields of desirable products, and accordingly low yields of undesirable products. The stability of a catalyst is a measure of the ability of the catalyst to maintain the activity and selectivity characteristics over a specified period of time. Thus, for example, a catalyst for successful reforming must possess good selectivity, i.e., be able to produce high yields of high octane number gasoline products and accordingly low yields of light hydrocarbon gases. The catalyst should also possess good activity in order that the temperature required to produce a certain quality product need not be too high. Also, the high stability is desired so that the activity and selectivity characteristics can be retained during prolonged periods of reforming operation. Thus, the temperature stability, which is generally referred to as the fouling rate of the catalyst, desirably is such that the temperature need not be raised at a high rate in order to maintain conversion of the feed to a constant octane product. Also, the yield stability of the catalyst desirably is such that the amount of valuable $C_5+$ gasoline products does not decrease appreciably during prolonged operation at a constant conversion.

As indicated above, the present invention is particularly concerned with catalytic reforming, that is, the treatment of naphtha fractions or feeds to improve the octane rating. Catalytic reforming operations are characterized by employing catalysts which selectively promote such hydrocarbon reactions as dehydrogenation of naphthenes to aromatics, dehydrocyclization of paraffins to naphthenes and aromatics, isomerization of normal paraffins to isoparaffins, and hydrocracking of relatively long-chained paraffins. Most catalysts used in reforming processes comprise platinum group components, particularly platinum, in association with porous solid carriers, for example, alumina. Research efforts have been expended to seek substitutes for platinum and/or to seek catalytic promoters to use with platinum catalysts to increase their activity, stability and selectivity characteristics.

For example, U.S. Pat. No. 3,415,737 is the recent basic patent directed to the use of platinum-rhenium catalysts for catalytic reforming, particularly reforming of low sulfur content naphtha feedstocks. Use of the platinum-rhenium catalyst (specifically platinum-rhenium-inorganic support-halide) of U.S. Pat. No. 3,415,737 has been found to result in improved yield stability and fouling rate stability compared to that achieved with platinum catalysts containing no rhenium.

That is, the decline in $C_5+$ liquid yield of a product of given high octane is lower than with the non-rhenium catalyst as a function of time, and also the increase in temperature in order to maintain a given high octane for the $C_5+$ product as the on-stream time progresses is lower than with the non-rhenium catalyst. The discovery of a platinum-rhenium catalyst for reforming low sulfur naphthas was thus regarded as an advance of major significance by the petroleum industry and as the most important development in the catalytic reforming field in the last 20 years or so; i.e., since reforming with a platinum-alumina catalyst was first introduced into the petroleum industry in place of the previously used molybdenum-alumina type catalysts; see "New Reforming Catalyst Features Improved Stability, High Yields" by D. H. Stormont, *Oil and Gas Journal,* Apr. 28, 1969, pages 63–65.

In view of the long time between the platinum-alumina and the improved platinum-rhenium-alumina reforming process, and the difficulty that laid between the basic platinum-alumina catalyst and finding a significantly improved new catalyst, namely the platinum-rhenium-alumina catalyst and its particular manner of use, it would indeed be unexpected to find still further improvements in catalytic reforming processes due to still further improved catalysts. However, the subject of the present invention is a further improvement in catalytic reforming due to an improved catalyst.

Before referring particularly to the present invention, two more relevant areas of prior art might be mentioned, namely use of platinum-germanium catalysts for catalytic reforming and art involving use of catalysts containing Group IIB components such as zinc.

U.S. Pat. No. 2,784,147 is directed to a reforming process using an alumina chromium oxide catalyst containing either germanium oxide, indium oxide or gallium oxide.

U.S. Pat. No. 2,906,701 is directed to a process for the reforming of hydrocarbons with catalysts comprising a support and a "solid solution" comprising germanium and a metal such as platinum. In U.S. Pat. No. 2,906,701 it is stated in Col. 3 that the exact state of the germanium is not known but that the germanium and platinum should be coreduced.

U.S. Pat. No. 3,578,584 is also directed to the use of reforming using a catalyst containing platinum and germanium, and according to Example 1 in U.S. Pat. No. 3,578,584 the catalyst is produced by a procedure involving coreduction of the platinum and germanium.

In all of the latter mentioned patents concerning germanium, there is no Group IIB metal such as zinc in the catalyst.

Referring now to some relevant art concerning zinc, U.S. Pat. No. 2,728,713 discloses a reforming catalyst comprising platinum on a base which is approximately equal molar zinc oxide and alumina oxide, for example, 30 to 50 weight percent zinc oxide. Thus, the zinc oxide is a portion of the base for the catalyst rather than being an added metal as in the case of platinum or other metals which might be added to the catalyst in the range of a few percent, say up to 5 percent or so. The zinc oxide-alumina oxide base is referred to as a zinc aluminate or as a zinc alumina spinel base. The formula for zinc alumina spinel is $ZnOAl_2O_3$, so that the amount of zinc is about 35 percent by weight of the support. Thus, U.S. Pat. No. 2,728,713 is not directed to using small amounts of zinc in the reforming catalyst.

In a series of patents assigned to Kellogg Co., such as U.S. Pat. No. 2,743,215, there is described catalysts which are prepared by methods comprising adding a Group IIB metal such as mercury to an aluminum sol, and ultimately volatilizing the Group IIB metal such as mercury out of the catalyst. Thus, the mercury is an agent in the catalyst preparation rather than a component of the final catalyst. The mercury is sometimes referred to as a promoting agent, but it could more properly be referred to as a treating agent. Thus it is stated in the patent that it is preferred that the promoting agent volatilize from the catalyst mass at or before calcination temperatures, and that in some instances the promoting agent is not volatilized at such temperatures, consequently the calcination operation may be conducted under sub-atmospheric pressures in order to remove substantially all of the promoting agent from the catalyst mass.

Example 1 of U.S. Pat. No. 2,743,215 illustrates the preparation method: a solution containing aluminum and mercury is prepared, a solution containing platinum is added, the mixture is then dried and then calcined at 1000° F. The finished catalyst is free of Group IIB component, that is, free of mercury in this instance.

Group IIB metals such as zinc have been disclosed for use in dehydrogenation catalysts, in Netherlands applications No. 6,908,540 and No. 7,008,386. Netherlands No. 6,908,540 discloses dehydrogenation catalysts containing Group VIIIB, e.g., platinum; and/or Group VIIB, e.g., rhenium; and Group IIB, e.g., zinc; and preferably an alkali component such as sodium. The actual examples in Netherlands 6,908,540 are of (a) dehydrogenation catalysts containing platinum plus Group IIB, and (b) dehydrogenation catalysts containing rhenium plus Group IIB. Netherlands No. 7,008,386 discloses dehydrogenation catalysts containing Group VIIIB, e.g., platinum, and Group IIB, e.g., plus zinc and preferably an alkali component such as sodium.

SUMMARY OF THE INVENTION

In accordance with the present invention, an improved hydroconversion process is conducted in the presence of a catalyst comprising a platinum group component, a Group IIB component, and a halogen associated with a porous solid carrier. The platinum group component is present in an amount of from 0.01 to 5 weight percent based on the finished catalyst; preferably the platinum group component is selected from the group consisting of a platinum component and a platinum component plus an iridium component. Preferably the Group IIB component is present in an amount from 0.01 to 5 weight percent and the halogen in an amount from 0.1 to 3 weight percent, based on the finished catalyst. According to a particularly preferred embodiment of the present invention, the catalyst also contains 0.01 to 3 weight percent of a second catalyst component, preferably selected from the group consisting of a rhenium component, a tin component, a germanium component and a lead component. The hydrocarbon hydroconversion process is preferably the catalytic reforming of naphtha or gasoline fractions to produce high octane products, because I have discovered that the aforementioned catalysts, especially the catalysts with said second component, give unexpectedly good results in catalytic reforming.

Also, in accordance with the present invention, a novel catalytic composition of matter has been discovered comprising a porous solid carrier, preferably a porous inorganic oxide carrier, having associated therewith from 0.01 to 5 weight percent of a platinum group component, 0.01 to 5 weight percent of a Group IIB component, and 0.1 to 3 weight percent of a halogen. According to a particularly preferred embodiment of the present invention the catalyst composition of matter also contains 0.01 to 3 weight percent of a second catalyst component, preferably selected from the group consisting of a rhenium component, a tin component, a germanium component and a lead component. The catalytic composition is preferably in a reduced state as defined later in the specification. The novel catalyst of the present invention is found to be highly active and stable for the reforming of naphtha and gasoline boiling range hydrocarbons and, in fact, is superior to commercial reforming catalysts containing only a platinum group component.

I have also found that the zinc level in the catalyst is a surprisingly important variable. For example, with increasing amounts of platinum from say about 0.3 weight percent up to 1.0 weight percent or more, catalyst performance (such as fouling stability) is improved by increasing the platinum, whereas increasing the zinc above about 0.5 weight percent has been found in my experiments to decrease the fouling stability. Thus, according to particularly preferred embodiments of my invention, the catalyst used in the catalytic reforming process contains less than 0.5 weight percent Group IIB metal, more preferably less than 0.3 weight percent. The Group IIB metal used in the catalyst is preferably zinc. The aforesaid low levels for a Group IIB metal such as zinc are especially preferred when the catalyst used in the catalytic reforming process of the present invention contains rhenium or germanium. In the case of a catalyst containing 0.3 weight platinum, 0.3 weight percent rhenium, and 1.1 weight percent chlorine on an Al$_2$O$_3$ support, in an accelerated catalytic reforming test run, I found relative fouling rates as follows as a function of zinc content:

| Zinc, Wt. % | Fouling Rate ° F/Hr. |
| --- | --- |
| 0 | 2.1 |
| .03 | 1.4 |
| .08 | 1.6 |
| .08 | 1.35 |
| .18 | 1.8 |
| .28 | 2.3 |

In my initial work with an added Group IIB metal, specifically added zinc, I had failures in the sense that the catalyst was no better (actually somewhat worse) than the catalyst having no added zinc. Specifically, when I added about 0.3 weight percent zinc to a PtReAl$_2$O$_3$ reforming catalyst I found no improvement. However, I also tried 0.3 weight percent cadmium and I did find some improvement with cadmium, although some of the cadmium appeared to be volatilizing from the catalyst. Then I tried a lower level weight percent cadmium which also gave some improvement. Then I decided to go back and again try the zinc addition which I had earlier given up on. This time zinc did not detract from the catalyst but instead I found that the added zinc, which was in the range of .01 to 0.3 weight percent, markedly improved the fouling stability of the catalyst.

One of the advantages of the Group IIB additive that I found is that it allows comparable catalyst performance at lower metal levels. Thus, a platinum-rhenium reforming catalyst has been found to perform as well or better at 0.2 weight percent platinum, 0.2 weight percent rhenium, .06 weight percent zinc compared to a similar catalyst in the same catalytic reforming service at 0.3 weight percent platinum, 0.3 weight percent rhenium but with no zinc. A particularly preferred embodiment of the present invention comprises catalytic reforming using a catalyst comprising less than 0.3 weight percent platinum and less than 0.3 weight percent of said second component (especially rhenium or germanium) but with an added Group IIB component (especially zinc).

DESCRIPTION OF THE DRAWINGS

The present invention may be better understood and will be further explained hereinafter by reference to the Figures.

DESCRIPTION OF THE INVENTION

The porous solid carrier or support which is employed in the preparation of the catalyst of the present invention can be any of a large number of materials upon which catalytically active amounts of a platinum group component, a Group IIB component, and a halogen component can be included. Preferably, the porous solid carrier is an inorganic oxide. A high surface area inorganic oxide carrier is particularly preferred, e.g., an inorganic oxide having a surface area of greater than 50 m$^2$/gm. Generally, the porous inorganic oxides which are useful as catalyst supports for the present invention have surface areas from about 50 to 750 m$^2$/gm.

For reforming processes, it is generally preferred that that catalyst has low cracking activity, that is, has limited acidity. It is preferred for reforming processes to use inorganic oxide carriers such as magnesia and alumina. Alumina is particularly preferred for purposes of this invention. Any of the forms of alumina suitable as a support for reforming catalysts can be used, e.g., gamma alumina, eta alumina, etc. Gamma alumina is particularly preferred. Furthermore, alumina can be prepared by a variety of methods satisfactory for the purposes of this invention. Thus, the alumina may be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of aluminum hydroxide gel. Also, alumina may be prepared by the reaction of metallic aluminum with hydrochloric acid, acetic acid, etc., in order to form a hydrosol which can be gelled with a suitable precipitating agent, such as ammonium hydroxide, followed by drying and calcination.

Natural or synthetically produced inorganic oxides or combinations thereof can also be used. Typical acidic inorganic oxide supports which can be used are the naturally occurring aluminum silicates, particularly when acid treated to increase the activity, and the synthetically produced cracking supports, such as silica-alumina, silica-zirconia, silica-alumina-zirconia, silica-magnesia, silica-alumina-magnesia, and crystalline zeolitic aluminosilicates.

For hydrocracking processes it is generally preferred that the carrier comprises a siliceous oxide. Generally, preferred hydrocracking catalysts contain silica-alumina, particularly silica-alumina having a silica content in the range of 30 to 99 weight percent.

The catalyst of the present invention in the broadest sense comprises a platinum group component, a Group IIB component, and a halogen in association with a porous solid carrier, particularly a porous inorganic oxide carrier. The platinum group component should be present in an amount of from 0.01 to 5 weight percent, preferably from 0.01 to 3 weight percent, based on the finished catalyst. The platinum group component embraces all the members of Group VIII of the Periodic Table having an atomic weight greater than 100, i.e., ruthenium, rhodium, palladium, osmium, iridium, and platinum, as well as compounds and mixtures of any of these. Thus, the platinum group components are the Group VIII noble metals or compounds thereof.

Platinum and platinum plus iridium are the preferred platinum group components because of their better performance in reforming and other hydroconversion reactions. When the platinum is used as the platinum group component with or without iridium, particularly in reforming processes, the preferred amount is from 0.01 to 3, more preferably 0.1 to 2 weight percent, and still more preferably 0.1 to 0.9 weight percent. As previously stated, one of the advantages of the present invention is that low platinum levels can be used because the added Group IIB component has been found to "make-up" for the withdrawal of substantial amounts of the very expensive platinum. Thus, especially preferred platinum levels are below 0.3 weight percent, e.g., 0.2 weight percent or lower.

When platinum plus iridium is used, the preferred concentration of iridium is 0.001 to 1 weight percent, more preferably 0.01 to 0.3 weight percent.

Regardless of the form in which the platinum group component exists on the carrier, whether as metal or compound, e.g., as an oxide, halide, sulfide, or the like, the weight percent is calculated as the metal. Reference to "platinum", "iridium", "platinum group component", etc., is meant to refer to both the metal and the compound form.

The Group IIB component is present on the catalyst in an amount of from 0.01 to 5 weight percent and preferably from 0.01 to 3 weight percent and more preferably from 0.1 to 1.5 weight percent, based on the finished catalyst. When the platinum group component is platinum plus iridium and/or when a second catalyst component, preferably a rhenium, tin, germanium, and/or lead component is present, the still more preferred amount of the Group IIB component is from 0.1 to 1.0 weight percent. Furthermore, as previously stated, it is especially preferred to use Group IIB metal levels below 0.5 weight percent, and that levels under 0.3 weight percent have been found particularly advantageous, e.g., levels in the range 0.01 to 0.2 weight percent. The Group IIB component can exist as an oxide, sulfide, or the like. Reference to "Group IIB" is meant to refer to both the metal and the compound form of the Group IIB metals, zinc, cadmium, and mercury. Regardless of the form in which the Group IIB component exists on the carrier, whether as the metal or in compound form, the weight percent is calculated as the metal.

When a rhenium component, a tin component, a germanium component, and/or a lead component is present, it is usually in an amount from 0.01 to 3 weight percent of the final composition and preferably from 0.01 to 1.0 weight percent. The weight percent is calculated as the metal.

The platinum group component, Group IIB component, and second catalyst component, preferably a rhenium, tin, germanium and/or lead component, when present, can be intimately associated with the porous solid carrrier by suitable techniques such as ion exchange, precipitation, coprecipitation, etc. Preferably, however, the components are associated with the porous solid carrier by impregnation. Furthermore, one of the components can be associated with the carrier by one procedure, e.g., ion exchange, and the other component associated with the carrier by another procedure, e.g., impregnation. As indicated, however, the components are preferably associated with the carrier by impregnation. The catalyst can be prepared by either coimpregnation of the platinum group component, Group IIB component, and second catalyst component, when present, or by sequential impregnation.

The platinum group component is preferably associated with the porous solid carrier by impregnation of water soluble compounds of the platinum group metals. For example, platinum may be added to the support by impregnation from an aqueous solution of chloroplatinic acid. Other water soluble compounds of platinum which may be incorporated as part of the impregnation solution are, for example, ammonium chloroplatinates, platinum chloride, polyammine platinum salts, etc. Iridium compounds suitable for including with the carrier include, among others, chloroiridic acid, iridium tribromide, ammonium chloroiridate, iridium trichloride, and ammonium bromoiridate. Compounds of the other platinum group components may be used as, for example, palladium chloride, rhodium chloride, etc. Impregnation solutions using organic solvents may also be used.

The Group IIB component is preferably associated with the porous solid carrier suitably by adsorption or impregnation. Impregnation can be accomplished using an aqueous or nonaqeous solution of a suitable compound.

Suitable Group IIB compounds which can be used for impregnation are the chlorides, nitrates, sulfates, acetates and ammine complexes. Also, useful Group IIB compounds include the organic zinc, cadmium, and mercury compounds.

When the Group IIB compound comprises zinc and when a second catalyst component is included with the catalyst, and especially when said second component is a rhenium component, it is preferred that the zinc component be included (e.g., by impregnation) with the catalyst prior to the inclusion of the second catalyst component, e.g., rhenium, therewith.

Rhenium compounds suitable for including onto the carrier include, among others, perrhenic acid and ammonium perrhenates in aqueous solution.

Tin compounds suitable for including onto the carrier include, among others, the chlorides, nitrates, sulfates, acetates, and amine complexes. Other useful tin compounds include the organic tin compounds, such as the tetra-alkyl compound (tetrabutyl, -phenyl, -ethyl, -propyl, -octyl, -decyl, tin and the like), and the tetra-alkoxide compounds (tin tetraethoxides, etc.). The tin can be in the stannous or stannic oxidation state.

Germanium compounds suitable for including onto the carrier include, among others, the chlorides, e.g., tetrachlorides and the other halides, nitrates, sulfates, acetates, and amine complexes. Also useful germanium compounds include the organic germanium compounds, such as the tetra-alkoxide compounds (germanium tetraethoxides, etc.).

Lead compounds suitable for including onto the carrier include, among others, lead chloride, lead nitrate, organic lead compounds such as tetraethyl lead and the like.

It is advantageous to promote the catalyst for hydrocarbon hydroconversion reactions by the addition of combined halogens (halides), particularly fluorine or chlorine. Bromine may also be used. The catalyst promoted with halogen usually contains from 0.1 to 10 weight percent, preferably 0.1 to 3 weight percent, total halogen content. When the halogen is chlorine, it even more preferably contains 0.5 to 2.0 weight percent and still more preferably 0.8 to 1.6 weight percent, total chlorine content. The preferred amounts are particularly desirable in reforming. The halogens may be incorporated onto the catalyst at any suitable stage of catalyst manufacture, e.g., prior to or following incorporation of the platinum group component and Group IIB component. Also, halogen may be incorporated with the catalyst by adding volatile, usually organic, halogens during a hydroconversion process along with the feed. Generally, the halogens can be combined with the catalyst by contacting suitable compounds such as hydrogen fluoride, ammonium fluoride, hydrogen chloride and ammonium chloride, either in the gaseous form or in the water soluble form with the catalyst. Preferably the fluorine or chlorine is incorporated with the catalyst from an aqueous solution containing the halogen. Often halogen is incorporated with the catalyst by impregnating with a solution of a halogen compound of a platinum group metal, Group IIB component and/or second catalyst component. Thus, for example, impregnation with chloroplatinic acid normally results in chlorine addition to the catalyst.

Following incorporation of the porous solid carrier with the platinum group component, the Group IIB component, the second catalyst component, if present, and the halogen, the resulting composite is usually treated by heating at a temperature of, for example, no greater than 500° F. and preferably at 200° to 400° F. Thereafter the composite can be calcined at an elevated temperature, as, for example, up to 1300° F., if desired. In the case of sequential deposition of the metal components onto the porous solid carrier, it may be desirable to dry and calcine the catalyst after the introduction of one of the metal components and prior to introduction of the other.

Following calcination, the catalyst containing a platinum group component and a Group IIB component, and a second catalyst component, if present, is preferably heated at an elevated temperature in a hydrogen containing atmosphere, preferably dry hydrogen to produce the catalyst in reduced form. It is particularly preferred that this treatment with hydrogen be accomplished at a range of 600° to 1,200° F. and preferably from 600° to 1,000° F. The heating in the presence of hydrogen preferably continues until the partial pressure of hydrogen substantially stabilizes. This will usually take 5 minutes or longer. The treatment in the presence of hydrogen should be accomplished in a hydrocarbon-free environment. Thus, any hydrocarbon on the catalyst should be removed prior to contact with the hydrogen. The environment should also be substantially free of carbon oxides. By "reduced form" it is not meant to imply that the entire catalyst or even all of the platinum group component and Group IIB component and second catalyst component, if present, are reduced to a zero valence state, although the great majority of the platinum group component is believed to be reduced to the metal (zero valence). The reduction of the catalytic composition as described above to form a reduced catalytic composition enhances the usefulness of the catalytic composition in, for example, reforming processes. Overheating and overly long heating during reduction should be avoided since this may lead to the loss of a substantial amount of the Group IIB component, especially if the Group IIB component is mercury or cadmium.

The novel catalytic composition of the present invention finds utility for various hydrocarbon hydroconversion reactions including hydrofining, hydrogenation, reforming, alkylation, dehydrocyclization, isomerization, and hydrocracking. The catalyst composition of the present invention is most advantageously used for reforming. The hydrocarbon feeds employed and the reaction conditions used will depend upon the particular hydrocarbon hydroconversion process involved and are generally well known in the petroleum art. The conditions of temperature, pressure, hydrogen flow rate, and liquid hourly space velocity in the reaction zone can be correlated and adjusted depending on the particular feedstock utilized, the particular hydrocarbon hydroconversion process, and the product desired. For example, hydrocracking operations are generally accomplished at a temperature of from about 450° to 900° F. and a pressure between about 500 to 10,000 psig. Preferably pressures between 1200 to 1600 psig are used. The hydrogen flow rate into the reactor is maintained between 1,000 to 20,000 SCF/bbl of feed and preferably in the range 2,000 to 10,000 SCF/bbl. The liquid hourly space velocity (LHSV) will generally be in the range of from 0.1 to 10 and preferably from 0.3 to 5.

As indicated above, the catalyst of the present invention is preferably employed in reforming. The feedstock desirably used for reforming is a light hydrocarbon oil, e.g., a naphtha fraction. Generally, the naphtha will boil in the range falling within the limits of from 70° to 550° F. and preferably from 150° to 450° F. The feedstock can be, for example, either a straight-run naphtha or a thermally-cracked or catalytically-cracked naphtha or blends thereof. The feedstock can preferably be low in sulfur, i.e., preferably contain less than 10 ppm sulfur and more preferably less than 5 ppm sulfur. In the case of a feedstock which is not already low in sulfur, acceptable levels can be reached by hydrogenating the feedstock in a presaturation zone where the naphtha is contacted with a hydrogenation catalyst which is resistant to sulfur poisoning. A suitable catalyst for this hydrodesulfurization process is, for example, an alumina-containing support with a minor proportion of molybdenum oxide and cobalt oxide. Hydrodesulfurization is ordinarily conducted at a temperature of from 700° to 850° F., a pressure of from 200 to 2000 psig, and a liquid hourly space velocity of from 1 to 5. The sulfur contained in the naphtha is converted to hydrogen sulfide which can be removed prior to reforming by suitable conventional processes.

The feedstock can preferably be low in moisture, i.e., preferably contain less than 50 ppm water (by weight) and more preferably less than 15 ppm moisture. This limits the amount of moisture that contacts the catalyst and thereby serves to keep the activity of the catalyst high for longer periods of time.

Reforming conditions will depend in large measure on the feed used, whether highly aromatic, paraffinic or naphthenic, and upon the desired octane rating of the product. The temperature in the reforming process will generally be in the range of about 600° to 1100° F. and preferably about 700° to 1050° F. The pressure in the reforming reaction zone can be atmospheric or superatmospheric. The pressure will generally lie within the range from 25 to 1,000 psig, preferably from about 50 to 750 psig, and more preferably from about 50 to 300 psig. The temperature and pressure can be correlated with the liquid hourly space velocity (LHSV) to favor any particularly desirable reforming reaction as, for example, dehydocyclization, or isomerization. Generally, the liquid hourly space velocity will be from 0.1 to 10, preferably from 1 to 5. The use of the catalysts of the present invention (especially Pt-Re and Pt-Ge species) in catalytic reforming allows the use of relatively higher space velocities and/or lower pressures and/or lower $H_2$ to hydrocarbon reactor feed ratios for catalytic reforming than is allowable with similar catalysts containing no Group IIB component and used to achieve a given reformer performance (given product octane, given fouling rate, etc.).

Reforming of a naphtha is accomplished by contacting the naphtha at reforming conditions and in the presence of hydrogen with the desired catalyst. Reforming generally results in the production of hydrogen. The hydrogen produced during the reforming process is generally recovered from the reaction products and preferably at least part of said hydrogen is recycled to the reaction zone. Preferably, the recycle hydrogen is substantially dried, as by being contacted with an adsorbent material such as molecular sieve, prior to being recycled to the reaction zone. Thus, excess or makeup hydrogen need not necessarily be added to the reforming process, although it is sometimes preferred to introduce excess hydrogen at some stage of the operation, for example, during startup. Hydrogen, either as recycle or makeup hydrogen, can be added to the feed prior to contact with the catalyst or can be contacted simultaneously with the introduction of feed to the reaction zone. Generally, during startup of the process, hydrogen is recirculated over the catalyst prior to contact of the feed with the catalyst. Hydrogen is preferably introduced into the reforming reaction zone at a rate of from about 0.5 to 20 moles of hydrogen per mole of feed. The hydrogen can be in admixture with light gaseous hydrocarbons.

It may be desirable in some instances, especially if the catalyst contains a rhenium component, to presulfide the catalyst prior to use in catalytic hydroconversion reactions, for example, reforming. The presulfiding can be done in situ or ex situ by passing a sulfur-containing gas, e.g., $H_2S$, and hydrogen through the catalyst bed. A temperature of from 25° to 1,100° F. or more can be used for the presulfiding. Other presulfiding treatments are known in the prior art. It may also be desirable on startup of the reforming process to use a small amount of sulfur, e.g., $H_2S$ or dimethylsulfide. The sulfur compound is added to the reforming zone in the presence of the flowing hydrogen. The sulfur can be introduced into the reaction zone in any convenient manner and at any convenient location. It can be contained in the liquid hydrocarbon feed, the hydrogen-rich gas, the recycle gas stream or any combination.

After a period of operation when the catalyst becomes deactivated by the presence of carbonaceous deposits, the catalyst can be regenerated, for example, by passing an oxygen-containing gas having no more than about 2 percent oxygen, into contact with the catalyst at an elevated temperature in order to burn carbonaceous deposits from the catalyst. The method of regenerating the catalyst will depend on whether there is a fixed bed, moving bed, or fluidized bed operation.

It is usually desirable to activate the catalyst after it has been regenerated by reacting it with an activating gas at a temperature of 700° F.–1200° F. for at least 0.5 hour and preferably from 0.5 hour to 24 hours, said activating gas including oxygen, preferably at least about 0.5 percent oxygen. More preferably, said activating gas also includes at least about 0.05 psia water. The activating technique is especially useful when the catalyst contains a tin component. When a tin component is present it is also preferable to activate the fresh catalyst. It is generally preferred to include a halogenating component with the activating gas when activating a deactivated and regenerated catalyst. The reason for this is that the deactivated and regenerated catalyst may have lost some halogen content during its use in a hydrocarbon hydroconversion process. The catalyst may be analyzed for halide content to determine whether a halogenating component should be included with the activating gas.

After regeneration, or regeneration and activation if the catalyst is activated, the catalyst is preferably heated at an elevated temperature in a hydrogen containing atmosphere to reduce it. Preferably, the heating is performed in the presence of a substantially hydrocarbon-free, hydrogen containing gas that is preferably substantially dry at a temperature from 600° F. to 1200° F., and more preferably from 600° F. to 1000° F. The substantially hydrocarbon-free hydrogen-containing gas is preferably also free of carbon oxides and water.

EXAMPLES

The process of the present invention will be more readily understood by reference to the following Examples.

EXAMPLE 1 — PLATINUM-ZINC CATALYST AND PROCESS

A catalyst, Catalyst A, comprising platinum and zinc in association with alumina was prepared by adsorbing $ZnCl_2$ and HCl on PHF-4 catalyst. PHF-4 catalyst is a commercially available catalyst made by American Cyanamid Company. The PHF-4 catalyst contained 0.3 weight percent platinum and 0.6 weight percent chlorine. The impregnated catalyst was dried overnight at about 300° F. The catalyst was calcined in flowing air for about 1 hour at 900° F. and then reduced in 1 to 2 atmospheres of hydrogen for 1 hour at 920° F. The resulting catalyst contained 0.3 weight percent platinum, 0.06 weight percent zinc and 1.0 weight percent chlorine.

Another catalyst, Catalyst B, comprising platinum and chlorine in association with alumina was prepared as follows. A PHF-4 catalyst was impregnated with hydrochloric acid. The impregnated catalyst was then dried, reduced and calcined substantially as above. The resulting catalyst contained 0.3 weight percent platinum and 0.9 weight percent chlorine.

Catalysts A and B were individually tested for reforming the naphtha feed having a boiling range of 151°

F. to 428° F. comprising 23.4 volume percent aromatics, 36.5 volume percent paraffins and 40.1 volume percent naphthenes. The feed was essentially sulfur-free and nitrogen-free. Reforming conditions included a pressure of 160 psig, a liquid hourly space velocity of 4.0 and a hydrogen-to-hydrocarbon mole ratio of 3.0. Once-through hydrogen was used in the reforming test. The temperature during the reforming test was adjusted to maintain conversion to 99 F-1 clear octane product.

The reforming processes were conducted under conditions chosen to simulate an accelerated life test for the catalysts. These conditions were not necessarily maintained at levels used in a commercial reforming process, but, in general, were much more severe to test in a relatively few hours how well the catalyst would perform.

Figure 1:
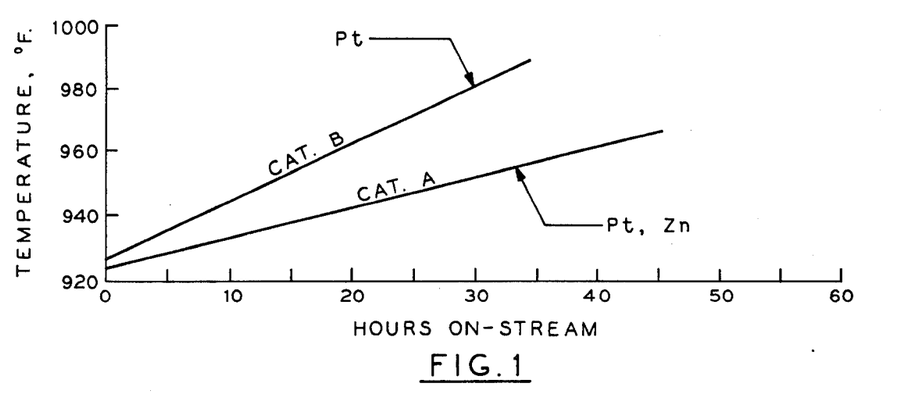
FIG. 1 illustrates that the fouling rate of a catalyst comprising 0.3 weight percent platinum and 0.06 weight percent zinc is considerably lower than the fouling rate of a catalyst comprising 0.3 weight percent platinum without zinc.

The increase in temperature necessary to maintain conversion 99 F-1 clear octane product was measured for Catalysts A and B to give an indication of the activity and temperature stability of each catalyst. The results are shown in the graphs in FIG. 1. FIG. 1 illustrates that Catalyst A, which contains 0.06 weight percent zinc promoter, exhibits a lower fouling rate under identical reforming conditions than does Catalyst B, which does not contain any zinc.

The change in yield of $C_5+$ gasoline product over the period of the run was also measured for each catalyst to give an indication of the yield stability of each catalyst. The $C_5+$ gasoline product yield, said product having an octane rating of 99 F-1 clear, was about the same for both catalysts.

EXAMPLE 2 — PLATINUM-RHENIUM-ZINC CATALYSTS AND PROCESSES

A catalyst, Catalyst C, comprising platinum, rhenium and zinc in association with alumina was prepared by adsorbing $ZnCl_2$ and HCl onto PHF-4 catalyst and then impregnating the catalyst with perrhenic acid. The catalyst was then dried overnight at about 300° F. The catalyst was calcined in flowing air for about 1 hour at 900° F. and then reduced in 1 to 2 atmospheres of hydrogen for 1 hour at 920° F. The resulting catalyst contained 0.3 weight percent platinum, 0.3 weight percent rhenium, 0.06 weight percent zinc and 1.1 weight percent chlorine.

Another catalyst, Catalyst D, comprising platinum, rhenium and chlorine in association with alumina was prepared as follows. A PHF-4 catalyst was impregnated with perrhenic acid and then hydrochloric acid. This catalyst was then dried, reduced and calcined substantially as above. The resulting catalyst contained 0.3 weight percent platinum, 0.3 weight percent rhenium and 1.0 weight percent chlorine.

Catalysts C and D were individually tested for reforming the naphtha of Example 1 under the conditions of Example 1.

The increase in temperature necessary to maintain conversion to 99 F-1 clear octane product was measured for Catalysts C and D to give an indication of the activity and temperature stability of each catalyst. The results are shown in the graph in FIG. 2.

Figure 2:
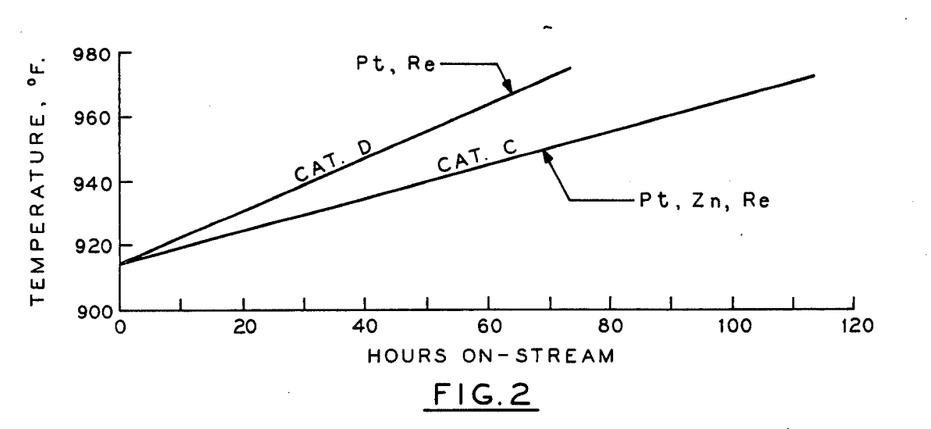
FIG. 2 illustrates that the fouling rate of a catalyst comprising 0.3 weight percent platinum, 0.3 weight percent rhenium and 0.06 weight percent zinc is considerably less than the fouling rate of a catalyst comprising 0.3 weight percent platinum and 0.3 weight percent rhenium without zinc.
Figure 3:
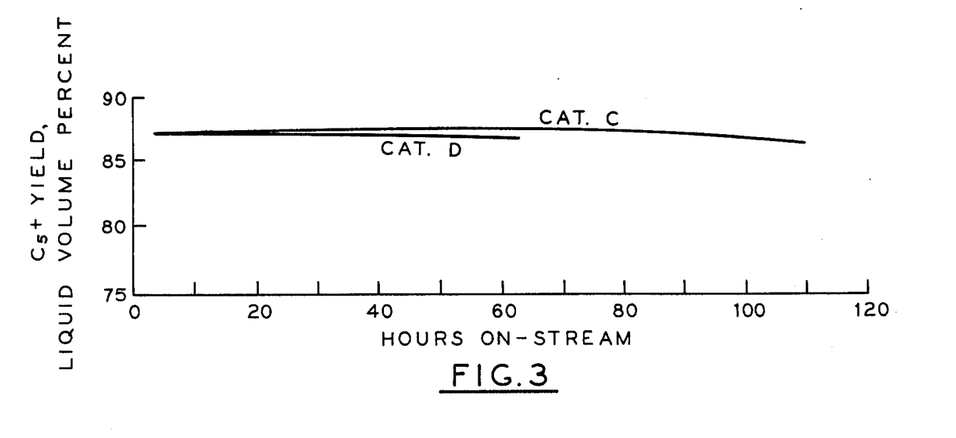
FIG. 3 illustrates that the yield stability of a catalyst comprising 0.3 weight percent platinum, 0.3 weight percent rhenium and 0.06 weight percent zinc is as good or better than the yield stability of a catalyst comprising 0.3 weight percent platinum and 0.3 weight percent rhenium without zinc.

FIG. 2 illustrates that Catalyst C, which contains 0.06 weight percent of a zinc promoter, exhibits a lower fouling rate under identical reforming conditions than does Catalyst D which does not contain a zinc promoter. The change in yield of $C_5+$ gasoline product over the period of the run was also measured for each catalyst to give an indication of the yield stability of each catalyst. The $C_5+$ gasoline product yield, said product having an octane rating of 99 F-1 clear, is shown in FIG. 3. FIG. 3 illustrates that Catalyst C, which contains 0.06 weight percent of a zinc promoter, exhibits at least as low of a yield decline as does Catalyst D which does not contain a zinc promoter.

The data presented in Examples 1 and 2 demonstrate that zinc is effective in improving the fouling rate of a platinum catalyst and a platinum-rhenium catalyst to an unexpectedly great extent.

EXAMPLE 3 — PLATINUM-MERCURY CATALYST AND PROCESS

Two catalysts were prepared: A comparison catalyst of the prior art (Catalyst P) having 0.3 weight percent platinum and 1.0 weight percent chlorine associated with an alumina support and a catalyst in accordance with the invention (Catalyst E) comprising 0.3 weight percent platinum, 0.3 weight percent mercury and 1.0 weight percent chlorine associated with an alumina support. Both Catalyst P and Catalyst E were prepared from PHF-4 catalyst. Catalyst E was prepared by impregnating PHF-4 catalyst with mercuric chloride. Each of the catalysts was dried by heating the catalyst overnight at 300° F. Each of the catalysts was calcined at 900° F. for 1 hour. A portion of Catalyst E was analyzed after calcining and was found to contain 0.053 weight percent mercury, i.e., the mercury content was reduced by the calcining, but a significant amount of mercury remained on the catalyst. Each of the catalysts was reduced, after the calcining, in 1 to 2 atmospheres hydrogen at a temperature of about 920° F. for about 1 hour. Catalyst P was sulfided at the end of being reduced in a hydrogen atmosphere. Catalyst E was sulfided after 1½ hours on-stream in the reforming process described below.

Catalysts P and E were tested for reforming of a naphtha feed having a boiling range of 151° F. to 428° F. comprising 23.4 volume percent aromatics, 36.5 volume percent paraffins, and 40.1 volume percent naphthenes. The feed was essentially sulfur-free and nitrogen-free. Reforming conditions included a pressure of 160 psig, a liquid hourly space velocity of 4.0 and a hydrogen-to-hydrocarbon mole ratio of 3.0 Once-through hydrogen was used in the reforming test. The temperature during the reforming test was adjusted to maintain conversion to 99 F-1 clear octane product.

Figure 4:
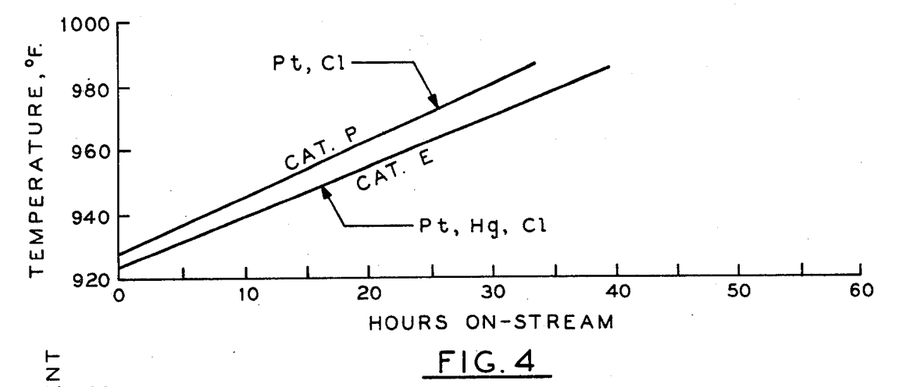
FIG. 4 illustrates that the fouling rate of a conventional catalyst comprising platinum and chlorine on alumina support is improved when mercury is included with said catalyst.

The reforming processes were conducted under conditions chosen to simulate an accelerated life test for the catalysts. These conditions were not necessarily maintained at levels used in a commercial reforming process, but, in general, were much more severe to test in a relatively few hours how well the catalyst would perform. The increase in temperature necessary to maintain conversion to 99 F-1 clear octane product was measured for each catalyst to give an indication of the activity and temperature stability of each catalyst. The results are shown in the graphs in FIG. 4.

Figure 5:
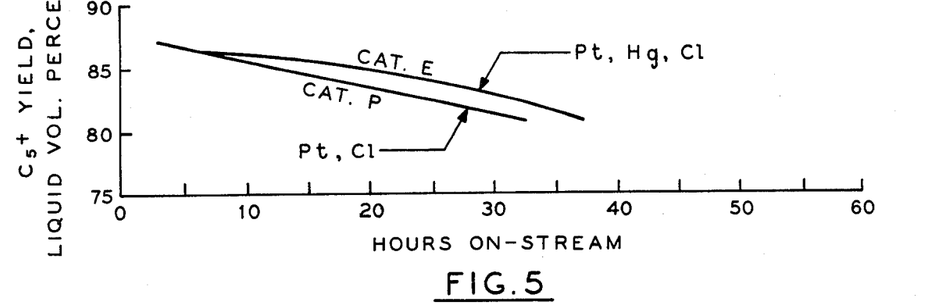
FIG. 5 illustrates that the yield stability of a conventional catalyst comprising platinum and chlorine on alumina support is not adversely affected by including mercury therewith.

The change in yield of $C_5+$ gasoline product over the period of the run was also measured for each catalyst to give an indication of the yield stability of each catalyst. The $C_5+$ gasoline product yield, said product having an octane rating of 99 F-1 clear is shown in FIG. 5.

Catalyst E in the reforming test exhibited a lower fouling rate (1.6° F./hour) than did Catalyst P (1.8° F./hour). As may be seen from FIG. 4, it was necessary to increase the temperature more rapidly for the process using the platinum catalyst without mercury in order to maintain a 99 F-1 clear octane product. The yield of $C_5+$ liquid product having the desired octane rating was substantially the same as a function of time onstream with Catalyst P as with Catalyst E. It was necessary to pre-sulfide both Catalyst P and Catalyst E to prevent excessive hydrocracking on startup.

EXAMPLE 4 — PLATINUM-CADMIUM CATALYST AND PROCESS

A catalyst, Catalyst F, comprising platinum, cadmium and chlorine, was prepared by the same method as was Catalyst E except that cadmium chloride was used in place of mercury chloride. Catalyst F was dried at a temperature of 300° F. overnight. Catalyst F was then calcined in flowing air for about 1 hour at 900° F. and was then reduced in 1 to 2 atmospheres of hydrogen for 1 hour at 920° F. The resulting catalyst contained 0.3 weight percent platinum, 0.3 weight percent cadmium, and 1.0 weight percent chlorine. Catalyst F was not sulfided.

Catalyst F was tested for reforming the naphtha feed of Example 1 under the same reforming conditions of Example 1. A sample of Catalyst F was analyzed for cadmium content at the end of the reforming run. This portion of Catalyst F was found to contain approximately 0.06 weight percent cadmium.

Figure 6:
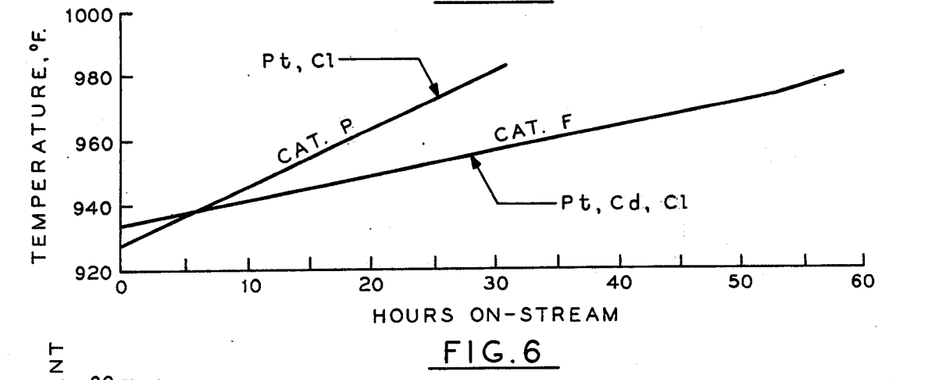
FIG. 6 illustrates that the fouling rate of a conventional catalyst comprising 0.3 weight percent platinum on an alumina support is significantly improved by including cadmium with said catalyst.
Figure 7:
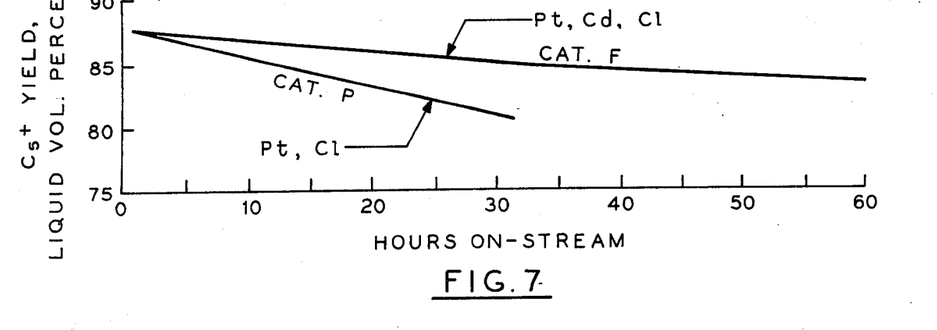
FIG. 7 illustrates that the yield stability as a function of time or temperature of a conventional catalyst comprising 0.3 weight percent platinum on alumina support is significantly improved by including cadmium with said catalyst.

The increase in temperature necessary to maintain conversion to 99 F-1 clear octane product was measured for Catalyst F to give an indication of the activity and temperature stability of this catalyst. The results are shown in the graph in FIG. 6. The results using Catalyst P are repeated in FIG. 6 for comparison purposes. The change in yield of $C_5+$ gasoline product over the period of the run was measured for Catalyst F to give an indication of the yield stability of this catalyst. The $C_5+$ gasoline product yield, said product having an octane rating of 99 F-1 clear, is shown in FIG. 7 as is the corresponding data for Catalyst P.

Catalyst F is clearly superior to Catalyst P. FIG. 5 illustrates that the fouling rate of Catalyst F is less than half the fouling rate of Catalyst P. FIG. 7 illustrates that the yield of $C_5+$ liquid product having the desired octane rating decreased significantly for the process using Catalyst P whereas Catalyst F performed remarkably well during the reforming test in that the yield of $C_5+$ liquid product remained high even after 60 hours on-stream. Further, Catalyst F was not sulfided prior to use in the reforming test. As can be seen from examination of the initial portion of the graph for Catalyst F in FIG. 7 excessive hydrocracking did not occur with Catalyst F. Catalyst P, on the other hand, was a sulfided catalyst since, in the absence of sulfur, Catalyst P would have given excessive hydrocracking in the initial period of reforming.

EXAMPLE 5 — RETENTION OF CADMIUM DURING REFORMING

Three catalysts comprising platinum and cadmium associated with alumina were prepared and were tested for reforming the naphtha of Example 1 under the conditions of Example 1. The presence of cadmium in each of the catalysts led to a lower fouling rate than was found with similar control catalysts which did not contain cadmium. The cadmium content of each of the three catalysts was determined both before the start of the reforming run and at the end of the reforming run. The following table sets out the cadmium contents.

| Cadmium Content Before Reforming, Wt. % | Cadmium Content After Reforming, Wt. % |
|---|---|
| .085 | .064 |
| .037 | .051 |
| .033 | .025 |

The data in the table above illustrates that within experimental error the cadmium contents of the catalysts comprising platinum and cadmium associated with alumina did not decrease significantly during reforming.

EXAMPLE 6 — PLATINUM-GERMANIUM-ZINC CATALYSTS AND PROCESSES

A catalyst, Catalyst G, comprising platinum, germanium, and zinc in association with alumina, was prepared as follows: The alumina used was a 1/16-inch extrudate of high purity gamma alumina with a surface area of approximately 190 square meters per gram. It was obtained from the American Cyanamide Company and was designated AEROEXTRUDATE 9999. This catalyst base was soaked in an aqueous solution of zinc chloride containing excess free HCl. The zinc and some of the chloride were chemisorbed on the alumina. The alumina was then dried and calcined for 1 hour in air at 900° F.

Platinum and germanium were coimpregnated on the zinc-containing alumina. Germanium dioxide was first reduced with hydrogen and then dissolved in chlorine water. Chloroplatinic acid and HCl were added to the germanium solution, and the mixed solution so obtained was used to impregnate the zinc-containing alumina described above. After impregnation, the catalyst was dried and calcined for two hours at 950° F. in air. The final catalyst contained 0.3 percent platinum, 0.4 percent germanium, 0.09 percent zinc and 0.8 percent chlorine.

A comparison catalyst, Catalyst H, comprising platinum and germanium in association with aluminum but without the presence of zinc, was also prepared. The method of preparation was identical to that described for Catalyst G above except that the zinc impregnating step was omitted. Catalyst H contained 0.3 percent platinum, 0.4 percent germanium, and 0.6 percent chlorine.

Catalysts G, H, and D (prepared in Example 2) were compared in a catalytic reforming test. The naphtha feed used was the same one described in Example 1. The reforming conditions included a pressure of 100 psig, a liquid hourly space velocity of 3.0, and hydrogen-hydrocarbon mole ratio of 3.0 Once-through hydrogen was used. The temperature during the reforming test was adjusted to maintain the F-1 clear octane number product at 100. These conditions were chosen to give a rapid comparison of the three catalysts and are much more severe than those customarily used in a commercial reforming process.

Figure 8:
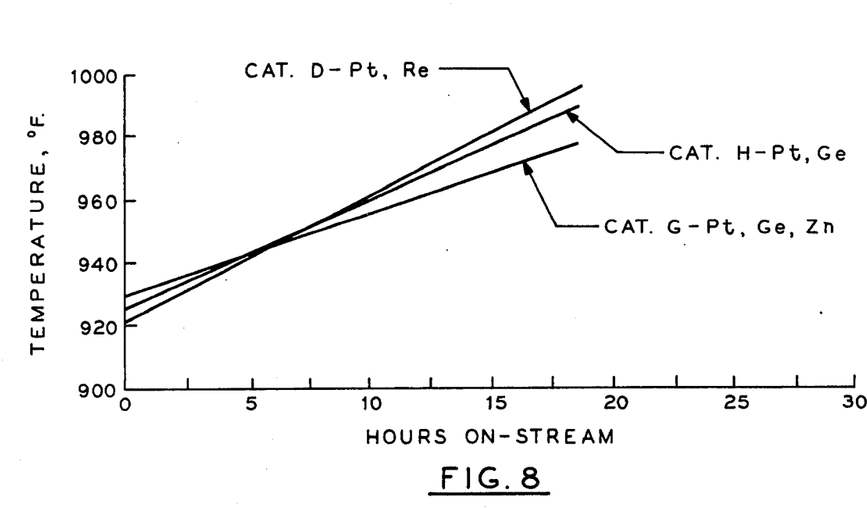

The increase in temperature necessary to maintain conversion to 100 F-1 clear octane number product was measured for Catalysts G, H and D to give an indication of the activity and temperature stability of each of these catalysts. The results are shown in the graphs in FIG. 8. The temperature initially required to obtain the desired octane number product was approximately the same for the three catalysts. However, in order to maintain this octane number, it was necessary to raise the temperature with Catalysts D and H much more rapidly than with Catalyst G. FIG. 8, therefore, demonstrates that the zinc in Catalyst G substantially lowers the fouling rate in comparison with the two catalysts which do not contain zinc.

Figure 9:
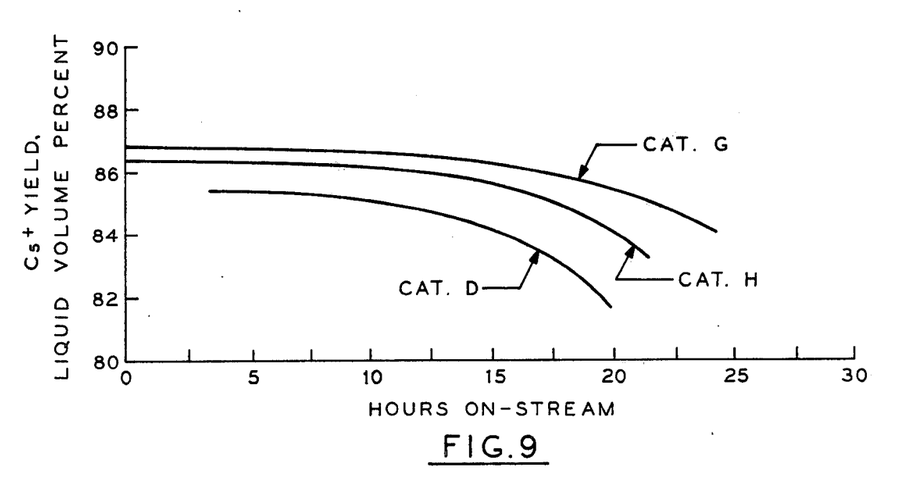

In FIG. 9, the liquid volume percent yield of $C_5+$ product is plotted against the hours on-stream for the same three runs illustrated in FIG. 8. The initial yield for Catalyst G is higher than for the other two catalysts, and it declines more slowly as the run progresses. This again demonstrates the beneficial effect of zinc in improving the stability of a catalyst comprising platinum and germanium.

The data from the runs for these three catalysts are summarized in the following table. Fouling rates are given in degrees Fahrenheit per hour, and the $C_5+$ yields tabulated are those measured in the early part of the runs before the decline in yield had set in. The superiority of the zinc-containing catalyst in both fouling rate and yield is clearly apparent.

| Catalyst Designation | Catalyst Components | Fouling Rate, °F/Hr | C + Yield, Liquid Vol. % |
|---|---|---|---|
| G | Pt, Ge, Zn | 2.65 | 86.8 |
| H | Pt, Ge | 3.50 | 86.4 |
| P | Pt, Re | 4.00 | 85.4 |

Catalysts G and H were also compared for their ability to aromatize normal paraffins. In this case, the conditions were also 100 psig, 3.0 liquid hourly space velocity, and 3.0 mole ratio of hydrogen to hydrocarbon. The feed was normal decane and the runs were conducted at a temperature which gave 82 weight percent of aromatics in the $C_5+$ product. The starting temperatures for Catalysts G and H were essentially identical, 932° and 933° F., respectively. The fouling rates in this case were also nearly the same; 1.00° F. per hour for Catalyst G and 0.95° F. per hour for Catalyst H. There was an appreciable difference, however, in the liquid volume percent yield of $C_5+$ product. Catalyst G produced 75.8 percent while Catalyst H produced 75.0 percent. The increase of 0.8 percent in $C_5+$ yield indicates that zinc has a beneficial effect on improving selectivity for the aromatization of paraffins of a catalyst containing platinum and germanium.

The foregoing disclosure of this invention is not to be considered as limiting since many variations can be made by those skilled in the art without departing from the scope or spirit of the appended claims.

That which is claimed is:

1. In a hydrocarbon hydroconversion catalyst composition including, on a porous carrier, 0.01 to 5 weight percent of a platinum component selected from the group consisting of platinum metal, platinum oxide, platinum sulfide or platinum halide, or mixtures thereof, 0.01 to 3 percent of a rhenium component selected from the group consisting of rhenium as an aqueous solution of perrhenic acid or ammonium perrhenate, or mixtures thereof, calcining and thereafter heating the catalyst composition in dry hydrogen, and a zinc component taken from the group consisting of zinc metal, zinc oxide, zinc sulfide or mixtures thereof, the improvement comprising, including 0.01 to 0.2 weight percent of said zinc component, calculated as the metal, in said composition.

2. A composition as defined in claim 1 wherein said porous carrier is alumina.

* * * * *